United States Patent [19]

Roelle

[11] Patent Number: 4,753,062
[45] Date of Patent: Jun. 28, 1988

[54] LAWN MOWER AND SAFETY CONTROL THEREFOR

[75] Inventor: David R. Roelle, Conroe, Tex.
[73] Assignee: Capro, Inc., Willis, Tex.
[21] Appl. No.: 60,675
[22] Filed: Jun. 11, 1987
[51] Int. Cl.[4] .................. A01D 75/28; A01D 69/00
[52] U.S. Cl. .................................... 56/10.5; 56/10.8
[58] Field of Search .................. 56/10.5, 10.8, 10.2, 56/DIG. 15

[56] References Cited

U.S. PATENT DOCUMENTS

| | | | |
|---|---|---|---|
| 4,236,494 | 12/1980 | Fairchild | 56/10.5 |
| 4,309,862 | 1/1982 | Carlson | 56/10.5 |
| 4,345,418 | 8/1982 | Arizpe | 56/10.5 |
| 4,363,206 | 12/1982 | Schmitt | 56/11.3 |
| 4,428,180 | 1/1984 | Carlson | 56/11.3 |
| 4,455,811 | 6/1984 | Beugelsdyk | 56/10.8 |
| 4,466,232 | 8/1984 | Beugelsdyk | 56/10.8 |
| 4,466,308 | 8/1984 | Kester | 56/10.5 |
| 4,580,455 | 4/1986 | Beugelsdyk | 56/11.3 |
| 4,599,912 | 7/1986 | Barnard | 56/11.3 |
| 4,667,459 | 5/1987 | Scanland | 56/10.8 |

FOREIGN PATENT DOCUMENTS 1039498 5/1953 France ...................... 56/10.8

Primary Examiner—Douglas Hart
Attorney, Agent, or Firm—Vinson & Elkins

[57] ABSTRACT

A lawn mower including a deck supported on wheels with an engine mounted thereon for rotating a blade positioned under the deck and being connected to the engine by a means controlling the rotation of the blade with respect to the engine, a cuttings container or bag directly connected to the deck to catch the cuttings, a cover closing the container or bag, a handle pivotally connected to the deck having means for alternately securing the position of the handle in the rearward (or cutting position) or in the vertical position, means connecting the handle to the cover to open the cover when the handle is moved to its vertical position, and an improved control secured to the handle and including cable means connecting to the blade control means, a bail controlling the position of the cable means to maintain the rotation of the blade while the bail is being held in its operating position, an ignition kill connection on the engine, circuit means connecting to said ignition kill connection and causing it to operate to stop the engine at any time the cover is opened while the bail is being held in bail down or operating position.

14 Claims, 3 Drawing Sheets

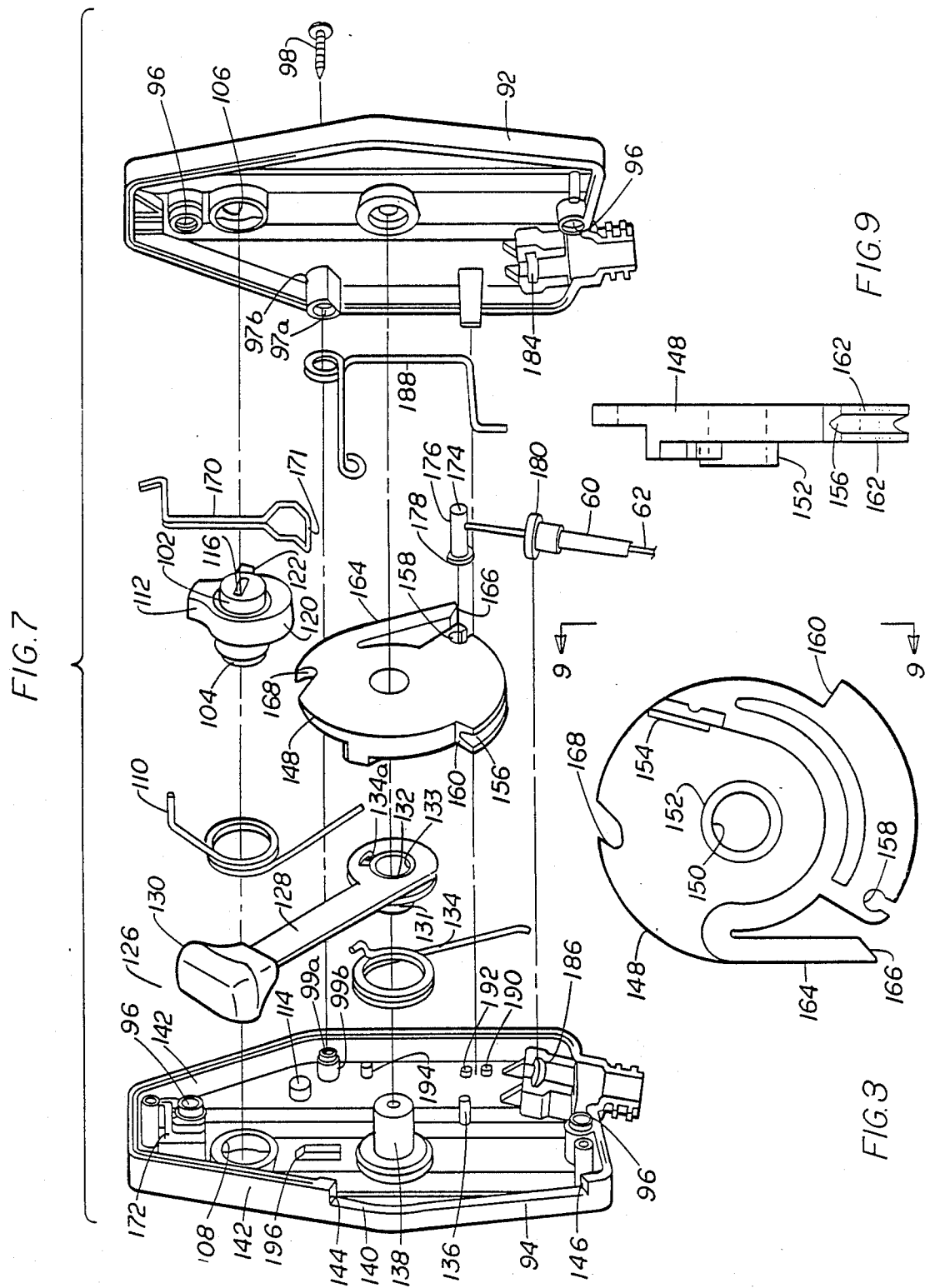

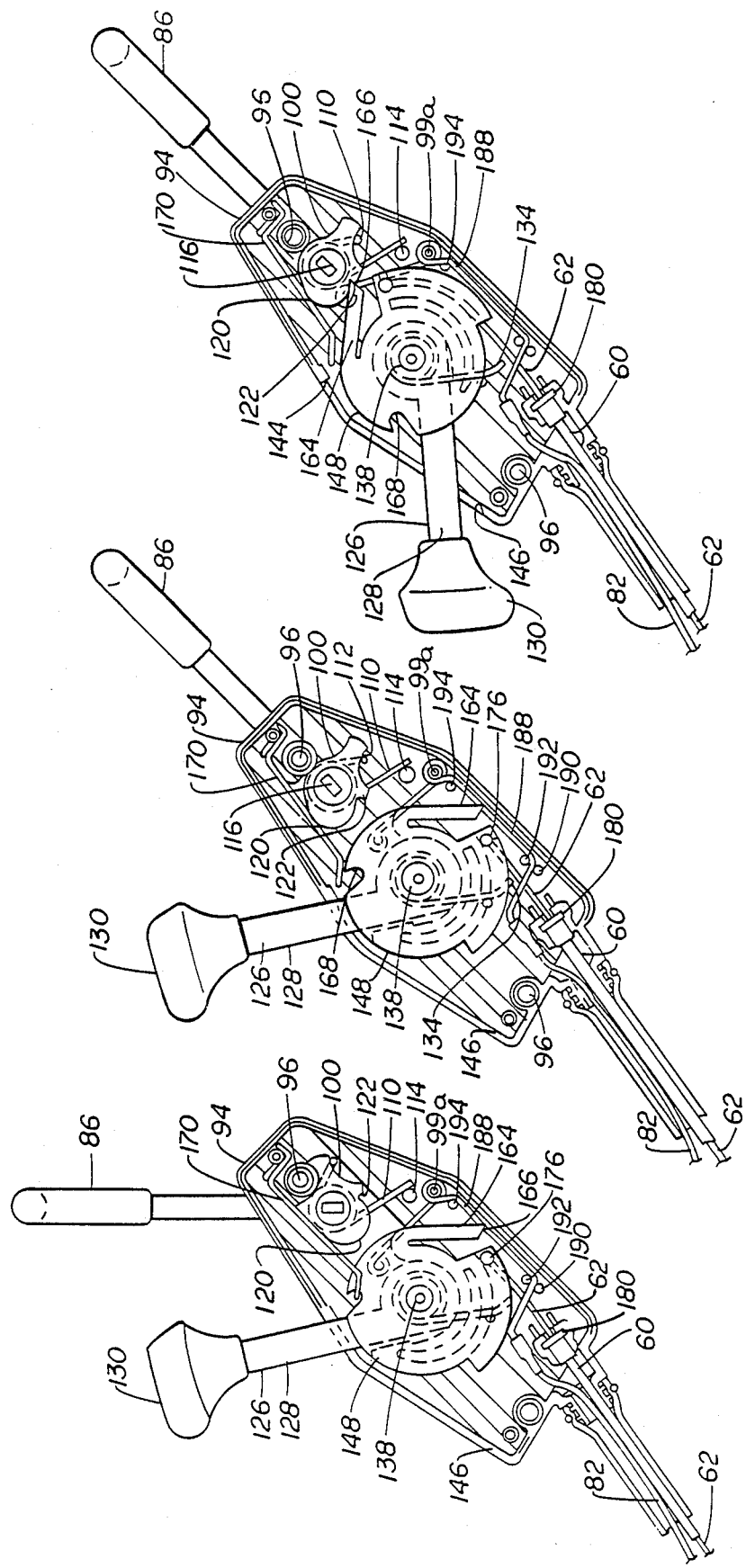

LAWN MOWER AND SAFETY CONTROL THEREFOR

BACKGROUND

The present invention relates to an improved lawn mower and an improved control which allows the opening of the cover of a fixed cuttings collector without danger to the operator.

Prior to the present invention, the removal of cuttings from the collector, container or bag has either subjected the operator to the flow of air and cuttings and other foreign bodies entrained in the air flow from the blade or a valved door has been provided to close the opening from the deck outlet into the bag as the bag is being removed. This valve door functioned as a check valve to ensure that there would not be any direct flow exiting the deck when the bag was removed.

Lawn mower controls have included the use of a bail to control the operation of a brake-clutch so that the blade does not rotate unless the bail is being grasped to the cross portion at the rear of the handle. In this manner the blade is stopped as the operator releases the bail to leave the rear of the handle and move into position to release and empty the cuttings from the bag. Such a system is not fool proof unless it is impossible to maintain the bail in its grasped position while the operator moves to the bag. The ingenuity of an operator can easily defeat this safety system.

U.S. Pat. No. 4,309,862 discloses a lawn mower control having a brake control cable which is operated by the bail.

U.S. Pat. No. 4,428,180 discloses another brake operating cable controlled by the position of the bail.

U.S. Pat. Nos. 4,363,206, 4,455,811, 4,466,232, 4,466,308, 4,580,455 and 4,599,912 all disclose various types of lawn mower controls having a bail or "dead man switch" which controls the operation of the blade through a clutch, brake or other means.

These controls provide some protection at least to the extent that if the operator releases the bail to move to the bag for emptying the cuttings, the blade rotation is stopped to protect the operator from the air blast of the blade and the entrained cuttings and other particles.

Because of the wear which is always found in most cable operated mechanisms, it has been the practice of the devices of the prior art to connect the cable to its operator with a slot type of lost motion connection. In some mechanisms this has been accomplished by having a pin secured on the end of the cable and allowing the pin to ride freely in a slot in its control disc so that as the mechanism wears there is sufficient cable to render full operation of such mechanism.

These controls have not always been satisfactory as they could be bypassed by the operator by fastening the bail to the cross portion of the handle or in some cases the bail could be held by one hand while the operator's other hand is used to open the bag. This is particularly true when the cuttings container or bag is secured to the deck and has a cover which is opened to remove the cuttings.

SUMMARY

The present invention is directed to an improved lawn mower having a cuttings container or bag secured to the deck and closed with a pivotal cover and to an improved engine shut off control which ensures that the blade does not continue to rotate when the bag cover is opened.

The improved mower includes a deck suitably supported, as by wheels with an engine mounted thereon for rotating a blade positioned under the deck and being connected to the engine by a means controlling the rotation of the blade with respect to the engine, a cuttings container or bag directly connected to the deck to catch the cuttings, a cover closing the container or bag, a handle pivotally connected to the deck having means for alternately securing the position of the handle in the rearward (or cutting position) or in the vertical position, means connecting the handle to the cover to open the cover when the handle is moved to its vertical position, and an improved control secured to the handle and including cable means connecting to the blade control means, a bail controlling the position of the cable means to maintain the rotation of the blade while the bail is being held in its bail down position, an ignition kill connection on the engine, circuit means connecting to said ignition kill connection and causing it to operate to stop the engine at any time the cover is opened while the bail is being held in its bail down or operating position. The controlling means is preferably in the form of a combination clutch-brake which disengages the blade from the engine drive shaft and applies the brake to stop the blade rotation in one position and releases the brake and engages the driving connection between the engine drive shaft and the blade in the other position. The improved control includes a switch operated by the position of the cable disc, which is held in its running position by the bail disc, to close when the bail holds the cable disc in its running position and such switch is in series with a second switch which is sensitive to the position of the bag cover. Raising of the cover closes the second switch completing the ignition kill circuit to shut off the engine if the bail is held in bail down position retaining the cable disc in running position with the control switch closed.

An object of the present invention is to provide an improved lawn mower with a fixed cuttings container or bag having a cover and which ensures that the blade is not turning if the container cover is opened in the normal manner.

Another object is to provid an improved lawn mower with improved control means which ensures that the blade stops with any opening of the cuttings container cover.

A further object is to provide an improved lawn mower control which provides control of the blade brake and clutch and further includes a means for killing the engine if the cuttings container cover is raised while the bail is being held in its bail down position.

A still further object of the present invention is to provide an improved lawn mower control having simple means for securing the clutch brake control disc in its blade stop position until the bail is moved to its operating position.

Still another object is to provide an improved lawn mower control which compensates for the wear in the mechanism to which the cable is connected which does not involve movement of the cable end relative to the control element to which it is connected.

BRIEF DESCRIPTION OF THE DRAWINGS

These and other objects and advantages of the present invention are hereinafter set forth and explained with reference to the drawings wherein:

FIG. 4 is an elevation view of the improved control of the present invention with the cover removed and showing the bail in its bail up position and the control lever in its blade stop position.

FIG. 5 is another elevation view of the control illustrating the bail moved to its bail down position.

FIG. 6 is another elevation view of the control showing the control lever moved to blade rotating position and showing the closing of the control switch in the ignition kill circuit.

FIG. 7 is an exploded view of the improved control. In this view the housing section to the right of the drawing has purposely been rotated so that its interior is seen.

FIG. 8 is a plan view of the cable disc.

FIG. 9 is a side view of the cable disc taken along the line 9—9 in FIG. 8.

DESCRIPTION OF THE PREFERRED EMBODIMENT

Figure 1:
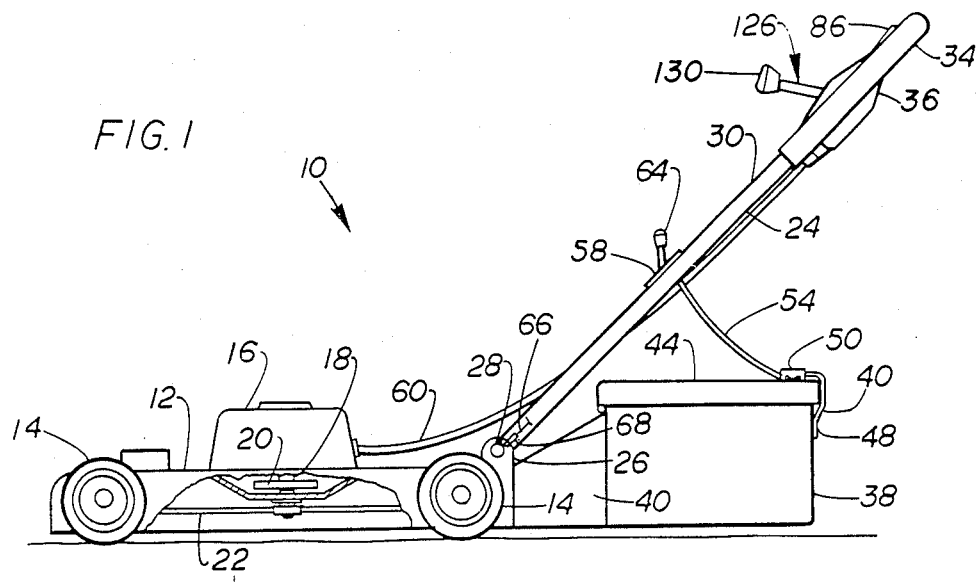
FIG. 1 is a side elevation of the improved lawn mower of the present invention showing its cuttings container cover in its closed position.

Improved lawn mower 10 of the present invention is illustrated in FIG. 1 in side elevation to show deck 12 supported on wheels 14 with engine 16 mounted on deck 12 and with a portion of deck 12 broken away to show engine drive shaft 18 connecting through clutch-brake means 20 to blade 22 below deck 12. While the preferred form of the invention is shown to have wheels 14, the invention has application to other types of lawn mowers which may or may not have wheels. Handle 24 is pivotally mounted to lugs 26 extending upwardly at each side of deck 12 by pins 28. Handle 24 is U-shaped having legs 30 and 32 being secured at their ends to lugs 26 by pins 28 and the outer cross portion 34 extending between the outer end of legs 30 and 32.

Control 36 is secured to one of legs 30 and 32 near cross portion 34 as hereinafter discussed and other suitable throttle and drive controls (not shown) are provided as needed and in a manner well known in the art.

Deck 12 is provided with a rear discharge for cuttings and cuttings container or bag 38 is secured to the rear of deck 12 and supported therefrom. Container 38 includes flaring inlet 40 communicating with collection chamber 42 and has cover 44 pivotally mounted to container 38 for closing the upper portion of chamber 42. Cover 44, when closed, is secured to container 38 by strap 46 which has its one end 48 secured to the rear surface of container 38 and includes latch 50 which is adapted to releasably engage structure 52 which is secured to the upper portion of cover 44 near its outer end. Strap 54 is secured to the outer end of cover 44 and extends in closed position under latch 50 and to switch 56 as shown in FIG. 3, and switch 56 is mounted on brace 58 which is secured at its ends to legs 30 and 32.

Control sheath 60 extends from control 36 to engine 16 and includes control cable 62 extending therethrough to connect from control 36 to clutch-brake control means 20.

Figure 1A:
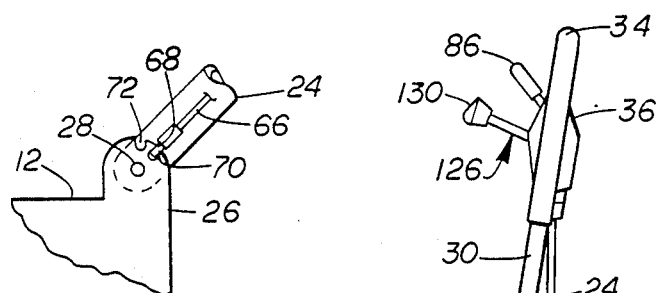
FIG. 1A is a partial view of the handle securing mechanism.
Figure 2:
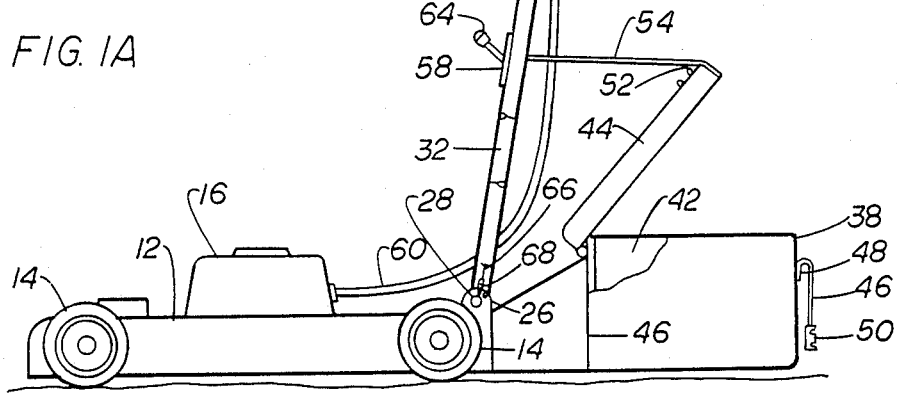
FIG. 2 is a side elevation of the lawn mower shown in FIG. 1 but having its handle moved to the vertical position and with the cuttings container cover being open.

As best seen in FIGS. 1 and 1A, lever 64 is pivotally mounted on brace 58 and operates cable 66 which extends to handle latching pin 68 which is suitably biased toward lug 26 to engage within one of recesses 70 or 72 in lug 26 to retain handle in its pushing or normal operating position as shown in FIG. 1 or its vertical position as shown in FIG. 2.

Figure 3:
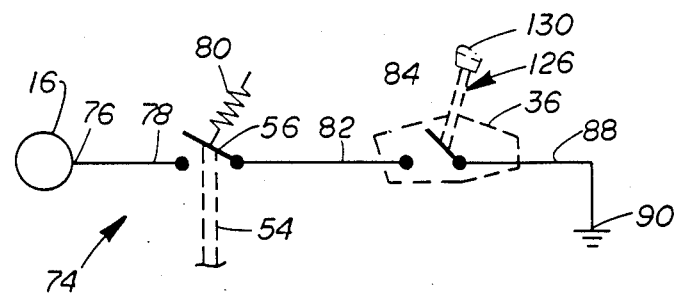
FIG. 3 is a schematic circuit diagram of the ignition kill circuit of the present invention.

Ignition kill circuit 74 shown in FIG. 3 includes kill connection 76 on engine 16 which is connected by wiring 78 to switch 56 which is biased by spring 80 to the open position as shown. As shown, strap 54 is connected to switch 56 as schematically shown to close switch 56 whenever handle 24 is raised to its vertical position. Any other suitable switch means may be provided which closes on opening of the cover 44. Wiring 82 connects from switch 56 to switch 84 in control 36. Switch 84 is normally open when bail 86 is in its bail up position and is closed as hereinafter explained with respect to the description of control 36 when bail 86 is moved to its bail down position retaining cable disc (hereinafter described) in its running position. Wiring 88 connects switch 84 to a suitable ground 90. In the preferred embodiment, cable 62 functions as wiring 88 to ground ignition kill circuit 74 to the engine 16.

Control 36 is illustrated in FIGS. 4 through 7. Control 36 includes two mating housing sections 92 and 94 which are normally assembled together with the control components positioned therein and with suitable bolting extending through openings 96 to secure control 36 to the handle leg (30 or 32) to which it is to be mounted. Control housing sections 92 and 94 include the usual interfitting pins and holes and tongue and groove engagement of their edges to ensure proper alignment of the sections and screw 98 which extends through opening 97a of post 97b which extends inward from housing section 92 and threads into opening 99a in post 99b which extends inward from housing section 94 to retain the sections together.

Bail disc 100 includes annular end shafts 102 and 104 extending from each side thereof to engage within openings 106 and 108 in housing sections 92 and 94 for pivotal mounting of bail disc 100. One end of spring 110 engages arm 112 of bail disc 100 and because of the engagement of the other end of spring 110 with projection 114 on housing section 94, spring 110 biases bail disc 100 in a counterclockwise direction as viewed in FIGS. 4 through 6. Slotted opening 116 extends through the center of bail disc 100 to receive the flattened end of bail 86. Bail disc 100 includes arm 112, cam surface 120 and shoulder 122. Arm 112, as mentioned above, engages one end of spring 110 and the other side of arm 112, when bail 86 is released, engages wall 124 extending from the interior of housing section 94 as shown in FIG. 4.

Control lever 126 includes arm 128 with a suitable grasping knob 130 at its outer end and opening 132 through the inner end of arm 128 with bushing 133 positioned within opening 132 and providing tubular extension 131. Spring 134 has one end extending through an opening in bushing 133 and is bent within recess 134a in arm 128 and its other end engaging post 136 which extends from the interior of housing section 94. Control lever 126 is mounted about post 138 and arm 128 extends out between housing sections 92 and 94 through recess 140 in lip 142 of housing section 92. Shoulders 144 and 146 at each end of recess 140 provide stops to the movement of control lever 126.

Cable disc 148 includes central opening 150 with depending annular lip 152 surrounding opening 150 on the side of disc 148 facing control lever 126 as best seen in FIG. 8. Cable disc 148 is pivotally mounted on post 138 with annular lip 152 positioned within opening 132 in control lever 126. Shoulder ridge 154 is provided on the same side of cable disc 148 as annular lip 152 and is adapted to be engaged by arm 128 of control lever 126 when it is moved as hereinafter explained. Cable disc 148 also includes peripheral cable groove 156 extending around a portion of disc 148 from opening 158 to shoulder 160. Opening 158 extends through disc 148 and also lips 162 at each side of groove 156 are slotted into opening 160 to allow installation of cable 62 as hereinafter described. Disc 148 is also formed to include arm 164 with shoulder 166 on its outer end. Additionally, latch slot 168 extends through disc 148 in position to receive latch spring 170 when disc 148 is in its inoperative or blade stop position. Loop 171 of latch spring 170 is positioned in groove 172 formed in housing section 94 around mounting opening 96 and as shown in FIGS. 4, 5 and 6 and extends outward into position for engagement within slot 168 when cable disc 148 is in its off position.

The operation of control 36 as illustrated in FIG. 4 commences with the movement of bail 86 to the bail down position by the operator. This rotates bail disc 100 against the biasing force exerted thereon by spring 110 and moves cam surface 120 into engagement with latch spring 170 to cam it away from latch slot 168 of disc 148 to release cable disc 148 for movement responsive to the movement of control lever 126. The angle of movement of bail 86 to move from its bail up or off position to its bail down or operating position is sufficient to rotate bail disc 148 to position cam surface 120 against and moving latch spring 170 completely out of engagement with latch slot 168. This same degree of rotation also moves shoulder 122 on bail disc 100 into position allowing arm 164 to move past the exterior surface of bail disc 100 and into supporting engagement with shoulder 122 when cable disc 148 is rotated. This supporting engagement retains cable disc 148 in its blade rotating or on position. Cable disc 148, after latch spring 170 is released, is rotated responsive to movement of handle 126 from its position in which arm 128 engages shoulder 144 to the position in which arm 128 engages shoulder 146. The movement of control lever 126 causes arm 128 to engage shoulder 154 of cable disc 148 to thus rotate cable disc 148. This movement is sufficient to rotate cable disc 148 into position with leg shoulder 166 supported on shoulder 122 of bail disc 100.

It should be noted that cable disc 148 is free to rotate independent of bail disc 100 and since in their positions shown in FIG. 4 there is a space between handle 28 of control lever 26 and shoulder ridge 154 of cable disc. This allows slack in cable 62 and to thereby accommodate with sufficient slack for the future wear in the mechanism to which cable 62 is connected. It should be noted that cable disc 148 does not include a spring within control 36 for biasing but is biased by the usual spring on the engine for biasing the mechanism (whether clutch, brake or a combination thereof) to the blade stop position.

Cable 62 includes pin 174 secured its end by suitable means such as by die casting the pin thereon to make a good electrical connection between pin 174 and cable 62. Pin 174 includes shank 176 and head 178. Pin 174 is inserted into opening 158 to position cable 62, which extends into control 36, within groove 156 on the exterior of cable disc 148. Head 178 and shank 176 of pin 174 are flattened as shown in the FIG. 7 for better electrical contact as hereinafter described. Since flange 180 on cable sheath 182 is secured within grooves 184 and 186 formed the interior of housing sections 92 and 94, the rotation of cable disc 148 pulls cable 62 into control 36 to thereby actuate the clutch-brake means 20, which structure is well known.

Spring 188 is mounted within housing section 94 as best seen in FIG. 4. It extends from the connection to wiring 82 between posts 190 and 192, extending inward from housing section 94, between lip 142 and post 194, around post 99b and under cable disc 148 to the relaxed position shown in FIG. 4. Head 178 on pin 174 extends to a position between cable disc 148 and the interior of housing section 94. Spring 188 is supported on extended surface 196 on the interior of housing section 94 so that as cable disc 148 is rotated, pin 174 is moved into direct electrical contact with spring 188 making electrical contact through cable 62 to ground. Head 178 on pin 174 maintains contact between pin 174 and spring 188. Cable 62 functions in ignition kill circuit 74 as wiring 88 connecting to ground 90. Spring 188 functions as control switch 84.

After cable disc 148 has been moved to its operating position, it is supported by bail disc 100 and control lever 126 can be released and allowed to return to its position with its arm 128 engaging shoulder 144.

From the foregoing description it can be seen that the structure of the present invention provides a structure in which the opening of the cover 44 on the cuttings bag 42 while the bail remains in bail down position (which would normally cause the blade to continue its rotation) causes the engine to stop responsive to a completion of the ignition kill circuit through cover sensitive switch 56 and control switch 84. The cover switch 56 is closed by any action which commences the opening of cover 44. It may be the tensioning of strap 54 as handle 24 is raised to its vertical position as previously described or a switch which is closed whenever the latch 50 is disengaged from structure 52. This ensures that whenever cover 44 is being opened, the bail is either released, to cause the brake to stop the blade rotation or the ignition kill circuit is actuated stopping the engine.

What is claimed is:

1. A lawn mower comprising
   a deck mounted on wheels,
   an engine mounted on the deck and having a drive shaft and an ignition kill connection,
   a blade control means connected to the engine drive shaft and having a drive shaft extending below the deck,
   a blade mounted for rotation on the blade control drive shaft below the deck,
   a handle pivotally mounted to the deck,
   a container connected to the deck to receive the cuttings therein by the blowing action of the rotating blade,
   a cover connected to said container for closing and opening access thereto,
   a control secured to the handle and having a bail to operate said blade control means, and
   a kill circuit connecting from the engine kill connection to ground and having a first- switch and a second switch,
   said first switch closing responsive to the initial opening movement of said cover,
   said second switch closing whenever said blade control means is in the blade rotating position.

2. A lawn mower according to claim 1 wherein said control includes
- a housing having a bail disc pivotally mounted therein,
- said bail engaging said bail disc for rotation thereof responsive to movement of said bail,
- a cable connecting from said blade control means to said control,
- said second switch including,
- a flexible wire connected to said ignition kill circuit and mounted within said housing in position to be engaged by the end of the cable when a cable disc and said cable are held in position by said bail disc providing rotation of said blade.

3. A lawn mower according to claim 2 wherein said control includes
- a cable disc pivotally mounted within said housing and to which said cable is connected so that on rotation of the cable disc the cable is moved to control operation of said blade control means.

4. A lawn mower according to claim 3 wherein said control includes
- means preventing rotation of said cable disc into its blade rotating position while said bail disc in in its bail up position,
- rotation of said bail disc into its bail down position releasing said cable disc rotation preventing means.

5. A lawn mower according to claim 4 wherein said rotation prevention means includes
- a slot in said cable disc, and
- a spring latch mounted within said housing and being biased into engagement with said cable disc to move into said slot when said cable disc is in its blade braking position.

6. A lawn mower according to claim 5 wherein said bail disc includes a cam surface on its exterior positioned to engage said spring latch to move it out of said cable disc slot when said bail disc is rotated by the movement of said bail to its bail down position.

7. A lawn mower according to claim 4 wherein said bail disc includes a shoulder on its exterior surface,
- said cable disc includes a leg extending tangentially outward,
- said shoulder being positioned with said bail disc in its operating position to receive and support said cable disc leg when said cable disc is in its blade rotating position.

8. A lawn mower control comprising
- a housing,
- a bail disc pivotally mounted within said housing and having means for receiving the end of a bail therein so that pivoting of the bail rotates said bail disc,
- a cable disc pivotally mounted within said housing,
- means for pivoting said cable disc between operating and nonoperating positions,
- a cable extending into said housing and being connected to said cable disc, pivotal movement of said cable disc moving said cable axially,
- a spring element positioned within said housing so that the spring is contacted by a pin on the end of said cable and electrically connected thereto, when said cable disc is moved to the operating position, and
- an electric wire extending into said housing and connecting to said spring element whereby contact of the end of the cable with the spring element completes an electrical connection from said electric wire through said spring element to said cable.

9. A lawn mower control according to claim 8 including
- means for latching said cable disc in its nonoperating position when said bail disc is in its nonoperating position.

10. A lawn mower control according to claim 9 wherein said latching means includes
- a slot in the peripheral surface of said cable disc,
- a latch spring mounted within said housing and biased to engage said cable disc slot when said cable disc and said bail disc are in their nonoperating positions.

11. A lawn mower control according to claim 10 wherein
- said bail disc includes a cam surface which engages and moves said latch spring out of said cable disc slot when said bail disc is moved to its operating position.

12. A lawn mower control according to claim 8 including
- means coacting between said bail disc and said cable disc to retain said cable disc in operating position while said bail disc remains in operating position.

13. A lawn mower control according to claim 12 wherein said retaining means includes
- a shoulder on said bail disc, and
- a leg extending outward from said cable disc,
- said shoulder being positioned to engage the end of said leg when said discs are both in their operating positions.

14. A lawn mower control according to claim 8 including
- a tubular projection extending from said housing in position to surround said cable, its sheath and said electric wiring, and
- means within said housing for securing the sheath of said cable in a fixed position to allow axial movement of the cable therein responsive to the rotation of said cable disc.

* * * * *